Mar. 3, 1925.

G. CATLETT

DISPLAY DEVICE FOR PICTURES

Filed June 9, 1924  2 Sheets-Sheet 1

1,528,603

Inventor
Gibson Catlett.

By
Attorney

Mar. 3, 1925.  1,528,603
G. CATLETT
DISPLAY DEVICE FOR PICTURES
Filed June 9, 1924    2 Sheets-Sheet 2
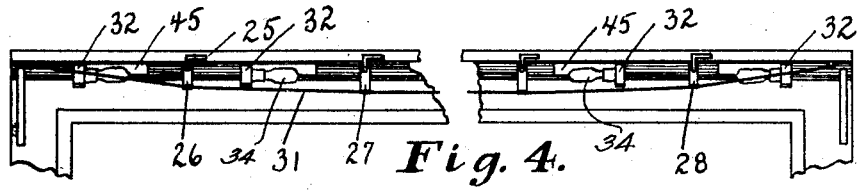
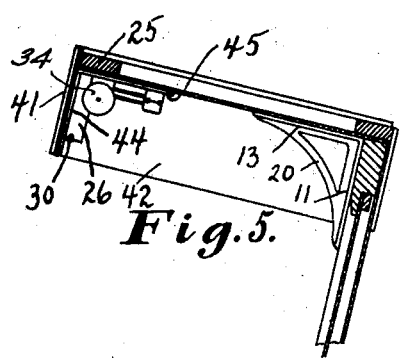
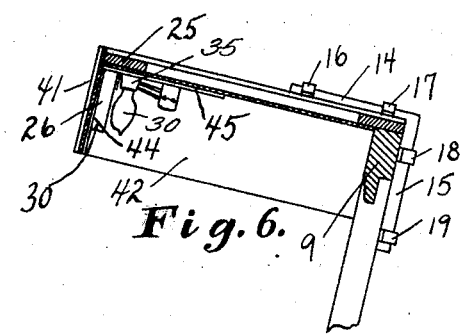
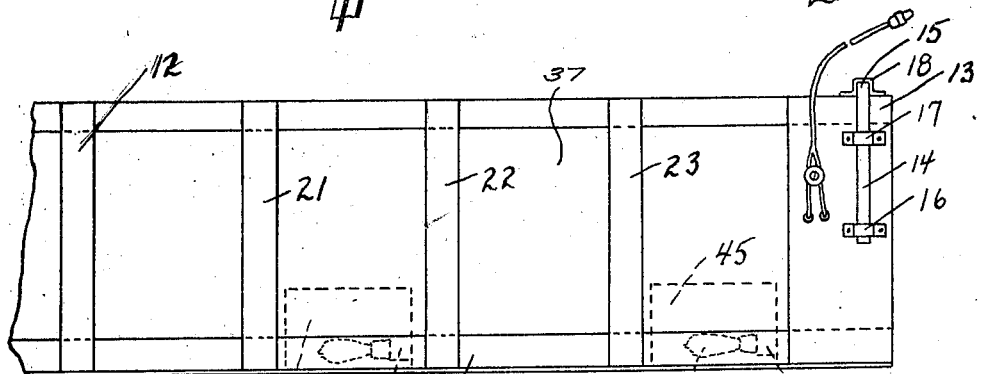
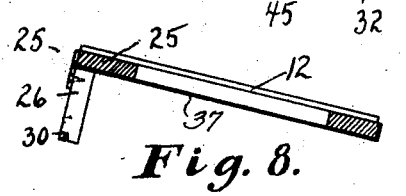
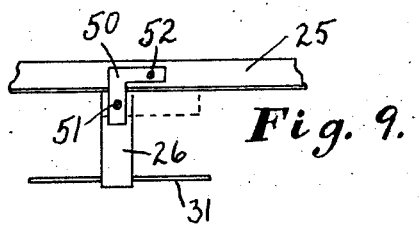
Inventor
Gibson Catlett.

Patented Mar. 3, 1925.

1,528,603

UNITED STATES PATENT OFFICE.

GIBSON CATLETT, OF CHICAGO, ILLINOIS.

DISPLAY DEVICE FOR PICTURES.

Application filed June 9, 1924. Serial No. 718,861.

*To all whom it may concern:*

Be it known that I, GIBSON CATLETT, a citizen of the United States, residing at Chicago, in the county of Cook and State of Illinois, have invented certain new and useful Improvements in Display Devices for Pictures, of which the following is a specification, reference being had to the accompanying drawing, forming a part thereof.

My invention relates to picture stands and supports of the type in which a picture is illustrated by artificial light, and has for its object to provide a device which will be simple and inexpensive to construct, will be adapted to support and illuminate a picture of any desired length, will be free from danger of fire and will be so constructed that it may be readily taken apart and its parts so packed as to take up slight space.

My invention is particularly adapted and intended for use in effectively displaying pictures such as used in advertising real estate developments and, while particularly intended for displaying such pictures indoors, is readily adaptable for outdoor display.

With the objects above indicated and other objects hereinafter described in view, my invention consists in the construction and combination of elements hereinafter described and claimed.

Referring to the drawings:—

Figure 4 is a front view on an enlarged scale showing the arrangement of the lighting means, the depending front of the canopy being removed.

Figure 5 is a cross sectional view of the forwardly extending frame and canopy on an enlarged scale.

Figure 6 is a view similar to Figure 5 but showing a modified construction.

Figure 7 is a top plan view of the canopy.

Figure 8 is a detail view of the connection of the depending strut with the longitudinal strip.

Figure 9 is a detail front view showing the hinge of the strut.

Figure 1:
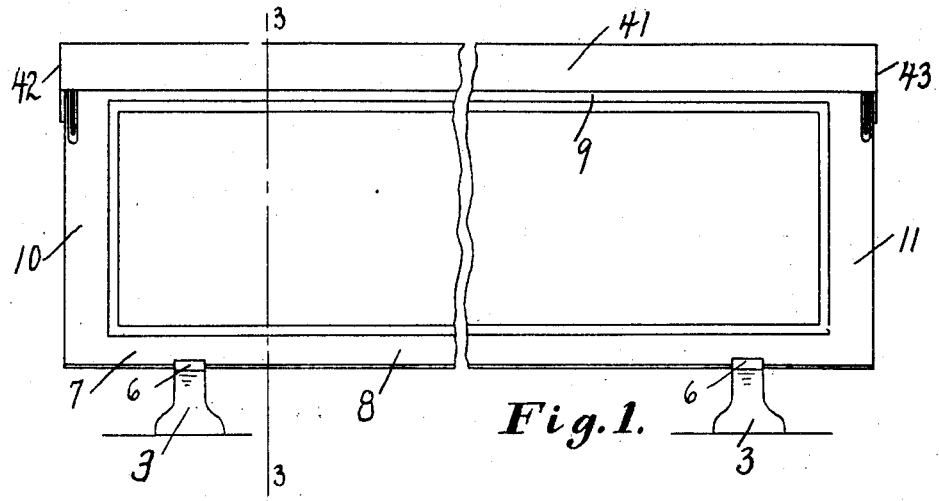
Figure 1 is a front view of a picture stand and support embodying my invention.

In the drawings 1 and 2 indicate respectively the front and back legs of a two legged easel. The front leg 1 has at its lower end a foot 3 extending laterally in both directions so as to afford a firm base to prevent the easel from falling over to either side. The two legs 1 and 2 are hinged together at their upper ends by hinge 4 and the extent to which their lower ends may be separated is limited by a chain or other flexible connection 5.

Two of these easels are used one near each end of the picture to be displayed. On the front leg 1 of each easel a short distance above the foot 3 is arranged a bracket 6 consisting of a block secured to the leg 1 and having at its upper end a recess 7 between its upper edge and the face of the leg 1 adapted to receive the lower edge of the lower portion 8 of the frame of the picture. The frame of the picture is rectangular and comprises the lower portion 8, upper portion 9 and end portions 10 and 11 each formed of molding of suitable width, the several parts being secured at the corners by the usual mitre joints. The upper portion 9 rests against the upper portion of the front legs 1 of the easels, the inclination of the legs 1 when the lower ends of the legs 1 and 2 are separated being sufficient to permit the frame to be held in proper exhibiting position by its own weight.

From near the upper edge of the portion 9 and preferably at right angles to the plane of the frame, extend in a forward direction, bars 12 and 13, one near each of the end portions 10 and 11 of the picture frame. These forwardly extending bars which are preferably of wood are each held in place preferably by a bracket consisting of legs 14 and 15 of metal, the leg 14 extending forward along the upper face of the bar and the leg 15 extending downward against the back of the end portion 10 (or 11) of the picture frame. For convenience in disassembling the bars 12 and 13 are provided with flat sockets 16, 17 suitably secured in position and adapted to receive the leg 14 and the end portions 10 and 11 of the frame are provided with similar flat sockets 18 and 19 adapted to receive the leg 15.

Figures 2, 3:
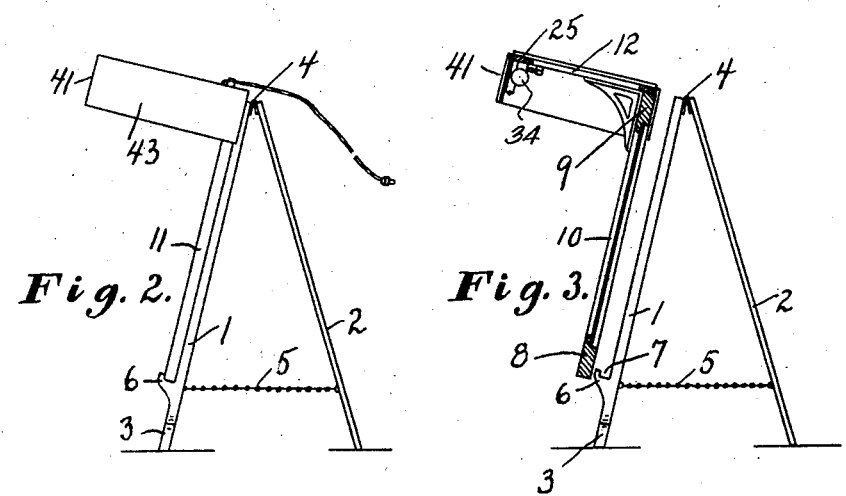
Figure 2 is an end view of the same.
Figure 3 is a vertical sectional view midway between the ends of the device, the picture and easel being shown as separate.

Instead of these special brackets the bars 12 and 13 may be supported from the end portions 10 and 11 by ordinary shelf brackets 20 secured to the front of the end portions 10 and 11 and to the under face of the bars 12 and 13 as shown in Figures 3, 4 and 5.

At suitable intervals depending upon the length of the picture to be exhibited additional forwardly extending bars 21, 22, 23 parallel with bars 12 and 13 are secured to the upper portion 9 of the frame in any convenient manner.

Along the forward ends of the bars 12, 13 (and 21, 22, 23) is secured a longitudinal strip 25 preferably of wood. To prevent any tendency to sagging this longitudinal strip 25 is provided at suitable intervals with depending struts 26, 27, 28 preferably hinged thereto and having in their lower ends suitable notches or saw cuts 30 to receive a wire 31 secured at its ends to the longitudinal strip 25 near its ends and serving with the struts 26, 27, 28 and the longitudinal strip 25 to form a truss.

In order to permit these struts to fold closely against the longitudinal strip 25 for transportation, they are hinged to the longitudinal strip by a flat angle iron 50, one arm of which is pivotally secured to the strut at 51, the other arm being pivotally secured to the face of the longitudinal strip at 52. The strain of the wire 31 holds the upper end of the strut against the under face of the longitudinal strip when the strut is in use.

Secured to the longitudinal strip 25 at suitable intervals are sockets to receive electric light bulbs. The preferred construction consists of a wooden block 32 depending from the longitudinal strip and adapted to carry on one side a socket for a long shanked electric light bulb 34. This arrangement permits the electric light bulbs to be so arranged that their filaments are horizontal and thus give better illumination for a relatively long picture. Instead of this arrangement sockets 35 may be secured to the under face of the longitudinal strip to receive depending electric light bulbs 36.

To the upper and under sides of the forwardly extending bars 12, 13, and the intermediate bars is preferably secured a sheet of strong paper 37 preferably of a neutral color to avoid under glare. Any other sheet material may be used in place of this paper 37.

From the front and end edges of the framework formed by the forwardly extending bars, the longitudinal strip 25, and the upper edge of the upper portion 9 of the picture frame depends a curtain preferably of heavy cloth of such as velours, having the depending portion 41 extending the full length of the longitudinal strip 25 and the depending portions 42 and 43 at the ends. The depending portions 42 and 43 extend below the level of the electric light bulbs so that they will not be visible from in front.

On the inner face of the depending portion 41 of the canopy opposite each of the electric light bulbs is secured a sheet 44 of asbestos and above each electric light bulb a similar sheet 45 of asbestos is secured to the paper 37. These sheets 44 and 45 serve to protect the portion 42 of the canopy, and the lining paper 37, from the heat of the electric light bulbs and being white or nearly so also serve as reflectors to throw the light back and downwardly upon the picture. The sheets 44 and 45 being substantially flat tend to disseminate the light reflected by them and thus avoid concentration of the light at any particular point and avoid the glaring effect of a metal reflector.

The blocks 32 for the sockets of the electric light bulbs are so placed that the bulbs when in position will be a short distance away from the depending portion 41. The struts 26, 27, 28 are in line with the front edge of the longitudinal strip 25 and act to hold the depending portion 41 away from contact with the bulbs.

The electric light bulbs are preferably colored slightly to correspond with the dominant color of the picture to be displayed.

The electric light bulbs or the sockets in which they are received are in circuit with insulated cable 47 which is led along the longitudinal strip 25. This insulated cable is of sufficient length at its free end to be connected with any convenient source of current.

When the display device is to be disassembled it is only necessary to detach the brackets from the picture frame and lift off the canopy. The depending portion 42 of the canopy may readily be folded inward over the longitudinal strip 25 and the end portion 43 may be folded inward onto the lining 37. The struts which carry the wire 31 are preferably hinged so as to fold. The picture with its frame may then be lifted off the easels and the legs of the easels folded together. The several parts may then be packed in relatively slight space.

When other convenient means for supporting the picture frame at a suitable angle are available the easels may be dispensed with.

It will of course be understood that while the device herein shown and described is particularly adapted and intended for displaying pictures it is equally adapted for displaying signs or the like.

Having thus described my invention what I claim is:—

1. In a device for displaying pictures, the combination with a frame extending forward from the upper edge of the picture frame, means for supporting a series of electric light bulbs at the forward edge of the forwardly extending frame, a curtain of nonmetallic material depending from the front edge of the forwardly extending frame in front of the electric light bulbs and a sheet of asbestos on the inside of the depending curtain in front of and opposite each electric light bulb.

2. In a device for displaying pictures, the combination with a frame extending forward from the upper edge of the picture frame, means for securing the forwardly extending frame to the frame of the picture, comprising brackets detachably secured to the forwardly extending frame and to the frame of the picture, means for supporting an electric light bulb at the forward edge of the forwardly extending frame, a curtain carried by the forwardly extending frame, having a portion thereof depending in front of the electric light bulb, a sheet of asbestos on the inside of the depending portion of the canopy in front of and opposite the electric light bulb.

3. In a device for displaying pictures, the combination with a frame extending forward from the upper edge of the picture frame, comprising forwardly extending bars and means for supporting them at their rear ends, a longitudinal strip carried by the forwardly extending bars, at their forward ends, depending struts carried by the longitudinal strip, a wire secured at its ends to the longitudinal strip near its ends and engaging the lower ends of the struts, means carried by the longitudinal strip for supporting an electric light bulb at the forward edge of the forwardly extending frame, a curtain depending from the front edge of the forwardly extending frame in front of the electric light bulb and resting against the depending struts and a sheet of asbestos on the inside of the curtain in front of and opposite the electric light bulb.

4. In a device for displaying pictures, the combination with a frame extending forward from the upper edge of the picture frame at right angles to the plane of the pictures, means for securing the forwardly extending frame to the upper portion of the picture frame, means for supporting an electric light bulb at the forward edge of the forwardly extending frame, a curtain depending from the front edge of the forwardly extending frame in front of the electric light bulb, a sheet of asbestos on the inside of the depending portion of the canopy in front of and opposite the electric light bulb and means for supporting the picture frame in inclined position.

In testimony whereof I affix my signature.

GIBSON CATLETT.